US011872772B2

(12) United States Patent
Sinha et al.

(10) Patent No.: US 11,872,772 B2
(45) Date of Patent: Jan. 16, 2024

(54) METHOD AND APPARATUS FOR FABRICATING A HYBRID TUBE

(71) Applicant: The Board of Trustees of the University of Illinois, Urbana, IL (US)

(72) Inventors: Sanjiv Sinha, Champaign, IL (US); Placid M. Ferreira, Champaign, IL (US); Nenad Miljkovic, Urbana, IL (US); Manjunath C. Rajagopal, Champaign, IL (US); Gowtham Kuntumalla, McKinney, TX (US); Akhilesh Sanjay Somani, McKinney, TX (US)

(73) Assignee: THE BOARD OF TRUSTEES OF THE UNIVERSITY OF ILLINOIS, Urbana, IL (US)

( * ) Notice: Subject to any disclaimer, the term of this patent is extended or adjusted under 35 U.S.C. 154(b) by 78 days.

(21) Appl. No.: 17/379,056

(22) Filed: Jul. 19, 2021

(65) Prior Publication Data

US 2022/0024154 A1 Jan. 27, 2022

Related U.S. Application Data

(60) Provisional application No. 63/056,255, filed on Jul. 24, 2020.

(51) Int. Cl.
*B29C 70/32* (2006.01)
*B29L 23/00* (2006.01)

(52) U.S. Cl.
CPC ........... *B29C 70/32* (2013.01); *B29L 2023/22* (2013.01)

(58) Field of Classification Search
CPC .............................. B29C 70/32; B29L 2023/22
See application file for complete search history.

(56) References Cited

U.S. PATENT DOCUMENTS

| 1,777,782 | A | * | 10/1930 | Bundy | B21C 37/124 165/184 |
| 5,106,356 | A | * | 4/1992 | Rhodes | B31C 3/00 493/271 |
| 2004/0185205 | A1 | * | 9/2004 | van de Camp | B31C 3/00 156/190 |
| 2014/0246142 | A1 | * | 9/2014 | Kendrick | B29C 53/582 156/187 |

OTHER PUBLICATIONS

Rajagopal et al. "Thermomechanical Design Optimization of Roll-to-Roll Manufactured Hybrid Metal Polymer Heat Exchanger," Mar. 15, 2019 (Year: 2019).*

(Continued)

*Primary Examiner* — Daniel McNally
(74) *Attorney, Agent, or Firm* — Crowell & Moring LLP

(57) ABSTRACT

An apparatus for fabricating a hybrid tube includes a rotatable mandrel and a first housing configured to translate alongside the rotatable mandrel while dispensing a first strip to be helically wound about the mandrel. The first housing includes an angle adjustment mechanism to control a dispensation angle of the first strip. The apparatus also includes least one energy or adhesive source for bonding overlapping strip portions on the rotatable mandrel and forming the hybrid tube. The at least one energy or adhesive source is configured for translation alongside the rotatable mandrel.

17 Claims, 9 Drawing Sheets

(56) References Cited

OTHER PUBLICATIONS

Aymonier, "Poly(methyl methacrylate)/Palladium Nanocomposites: Synthesis and Characterization of the Morphological, Thermomechanical, and Thermal Properties," Chemistry of Materials, 15 (2003), pp. 4874-4878.
BCS, Inc., "Waste heat recovery: technology and opportunities in US Industry," Industrial Technologies Program, US Department of Energy, (2008), 1-112 pp.
Chen et al., "Recent research developments in polymer heat exchangers—A review," Renewable and Sustainable Energy Reviews, 60 (2016), pp. 1367-1386.
Choy et al., "Elastic modulus and thermal conductivity of ultradrawn polyethylene," Journal of Polymer Science Part B: Polymer Physics, 37 (1999), pp. 3359-3367.
Donato et al., "Numerical modeling of uneven thermoplastic polymers behaviour using experimental stress-strain data and pressure dependent von Mises yield 586 criteria to improve design practices," Procedia Engineering, 10 (2011), pp. 1871-1876.
Eacock et al., "Effect of Different Oxide Layers on the Ultrasonic Copper Wire Bond Process," IEEE 66th Electronic Components and Technology Conference (ECTC), (2016) pp. 2111-2118.
Edmans et al, "Large-Scale Analysis and Local Stress Assessment of Flexible Unbonded Pipes Using FEA," Proceedings of the ASME 2012 31$^{st}$ International Conference on Ocean, Offshore and Artic Engineering, Rio de Janiero, Brazil (2012), pp. 947-953.
Edmans et al., "Local Stress Assessment of Flexible Unbonded Pipes Using FEA," Proceedings of the ASME 2012 31$^{st}$ International Conference on Ocean, Offshore and Artic Engineering, Rio de Janiero, Brazil (2012), pp. 939-945.
Fujishiro et al., "Thermal Conductivity and Diffusivity of High-Strength Polymer Fibers," Japanese Journal of Applied Physics, 36 (1997), pp. 5633-5637.
Hussain et al., "Review of polymers for heat exchanger applications: Factors concerning thermal conductivity," Applied Thermal Engineering, 113 (2017), pp. 1118-1127.
Kim et al., "High thermal conductivity in amorphous polymer blends by engineered interchain interactions," Nature Materials, 14 (2014), pp. 295-300.
Kumlutas et al., "A Numerical and Experimental Study on Thermal Conductivity of Particle Filled Polymer Composites," Journal of Thermoplastic Composite Materials, 19 (2006), pp. 441-455.
Li et al., "Effect of Lattice Mismatch on Phonon Transmission and Interface Thermal Conductance Across Dissimilar Material Interfaces," Physical Review B 86 (2012), pp. 054305-1 to 054305-13.
Luo et al., Effect of the Thickness of a Thermal Interface Material (solder) on Heat Transfer Between Copper Surfaces, The International Journal of Microcircuits and Electronic Packaging, 24, 2, (2001), pp. 141-147.

Meng et al., "Ultrasonic Welding of Soft Polymer and Metal: A Preliminary Study," Proceedings of ASME International Manufacturing Science and Engineering Conference, MSEC2019-2938, (2019), 1-8 pp.
Poulaert et al., "Thermal-Conductivity of Highly Oriented Polyethylene Fibers," Polymer Communications, 31 (1990), pp. 148-151.
Rajagopal et al., Thermomechanical Design Optimization of Roll-to-Roll Manufactured Hybrid Metal Polymer Heat Exchanger, Presentation at ASME IMECE 2018, Talk No. IMECE2018-89791 (2018), pp. 1-19.
Raghava et al., "The Macroscopic Yield Behaviour of Polymers," Journal of Materials Science, 8 (1973), pp. 225-232.
Roy et al., "Thermal Conductance of Poly(3-methylthiophene) Brushes," ACS Applied Materials & Interfaces, 8 (2016), pp. 25578-25585.
Rusu et al, "Mechanical and Thermal Properties of Zinc Powder Filled High Density Polyethylene composites," Polymer Testing, 20 (2001), pp. 409-417.
Shanker et al., "High Thermal Conductivity in Electrostatically Engineered Amorphous Polymers," Science Advances, 3, e1700342 (2017), pp. 1-8.
Shen et al. "Polyethylene Nanofibres with Very High Thermal Conductivities," Nature Nanotechnology Letters, 5 (2010), pp. 251-534.
Singh et al., "High Thermal Conductivity of Chain-Oriented Amorphous Polythiophene," Nature Nanotechnology, 9 (2014), pp. 384-590.
Smith et al., "Poly(3-hexylthiophene) Nanotube Array Surfaces with Tunable Wetting and Contact Thermal Energy Transport," ACS Nano, 9, 2 (2015), pp. 1080-1088.
Sofian et al., "Metal Powder-Filled Polyethylene Composites. V. Thermal Properties," Journal of Thermoplastic Composite Materials, 14, (2001), pp. 20-33.
Tavman et al., "Thermal and Mechanical Properties of Aluminum Powder-Filled High-Density Polyethylene Composites," Journal of Applied Polymer Science, 62, (1996), pp. 2161-2167.
Tekce et al., "Effect of Particle Shape on Thermal Conductivity of Copper Reinforced Polymer Composites," Journal of Reinforced Plastics and Composites, 26, 1 (2007), pp. 113-121.
Thekdi et al., "Industrial Waste Heat Recovery—Potential Applications, Available Technologies and Crosscutting R&D Opportunities," Oak Ridge National Laboratory, ORNL/TM-2014/622 (2014), 1-82 pp.
Wang et al., "Thermal Conductivity of High-Modulus Polymer Fibers," Macromolecules, 46 (2013), pp. 4937-4943.
Xu et al., Molecular Engineered Conjugated Polymer with High Thermal Conductivity, Science Advances, 4 (2018), pp. 1-6.
Yunyong et al., "Combustion Air Requirements for Power Burner Appliances," The Fire Protection Research Foundation, Quincy, MA (2012), pp. 1-68.

* cited by examiner

METHOD AND APPARATUS FOR FABRICATING A HYBRID TUBE

RELATED APPLICATION

The present disclosure claims the benefit of priority under 35 U.S.C. 119(e) to U.S. Provisional Patent Application No. 63/056,255, which was filed on Jul. 24, 2020, and is hereby incorporated by reference in its entirety.

FEDERALLY SPONSORED RESEARCH AND DEVELOPMENT

This invention was made with government support under contract number DE-EE0008312 awarded by the Advanced Manufacturing Office (AMO) of the Office of Energy Efficiency and Renewable Energy (EERE) under the U.S. Department of Energy. The government has certain rights in the invention.

TECHNICAL FIELD

The present disclosure is directed generally to tube manufacture and more particularly to fabricating composite (or "hybrid") tubes or pipes.

BACKGROUND

Heat exchangers are widely used in industrial cooling and heating processes to transfer heat between fluids. A typical heat exchanger includes one or more tubes that contain a first fluid to be heated or cooled, and a second fluid designed to absorb or provide heat is passed over the tube(s). Such heat exchangers typically include highly thermally conductive tubes having a size, shape and arrangement suitable for high-pressure applications.

Waste heat in the form of industrial emissions amounts to about 4.3% of total energy use by industry in the United States. Annually, about 1.5 trillion Btu of energy in the form of exhaust gas thermal emissions remains unrecovered. More than 80% of this waste heat is in what may be referred to as the low temperature regime (25° C.-150° C.). Despite the abundance of low temperature energy sources, the total amount of heat recovered from these sources is small when compared to high temperature sources (>650° C.). The small temperature "head" of low temperature sources is believed to increase the size and therefore cost of heat exchangers employed to recover the heat. Most low temperature heat recovery systems use copper pipes that are bent into a U-shape to increase residence time for the fluid to improve heat exchange. Such heat exchangers may suffer from high material costs and consequently long payback periods that challenge economically justifiable heat recovery. In contrast, polymer-based heat exchangers can be advantageous for low temperature heat recovery, as they may be lightweight, low cost, structurally flexible, and resistant to corrosion from flue gas condensates. However, heat exchangers based on polymer tubes typically are not suitable for operating internal pressures >1 MPa (150 psi) and may suffer from low overall heat transfer coefficient.

BRIEF SUMMARY

A method and apparatus for assembling a hybrid tube are described herein.

The method includes rotating a mandrel about a longitudinal axis thereof. During the rotating, a first strip is helically wound about the mandrel. The first strip is dispensed at a predetermined angle from a first housing translating alongside the mandrel. During or after the helical winding, while the mandrel is rotating, overlapping strip portions on the mandrel are bonded, and the hybrid tube is formed.

The apparatus includes a rotatable mandrel and a first housing configured to translate alongside the rotatable mandrel while dispensing a first strip to be helically wound about the mandrel. The first housing includes an angle adjustment mechanism to control a dispensation angle of the first strip. The apparatus also includes at least one energy or adhesive source for bonding overlapping strip portions on the rotatable mandrel and forming the hybrid tube. The at least one energy or adhesive source is configured for translation alongside the rotatable mandrel.

DETAILED DESCRIPTION

A method and apparatus for assembling a composite (or hybrid) tube from one or more strips comprising multiple materials, such as a polymer and a metal, is described in this disclosure. The method may be described as a strip-winding or roll-to-roll approach to fabricate hybrid tubes including controlled amounts of the multiple materials and having predetermined strip patterns. Hybrid tubes or pipes made in this way can be designed to meet specific needs, such as reduced material costs, increased corrosion resistance and/or improved flexibility. Consequently, the composite tubes may have industrial applications ranging from heat exchangers to aerospace components and flexible electronics.

Figure 1:
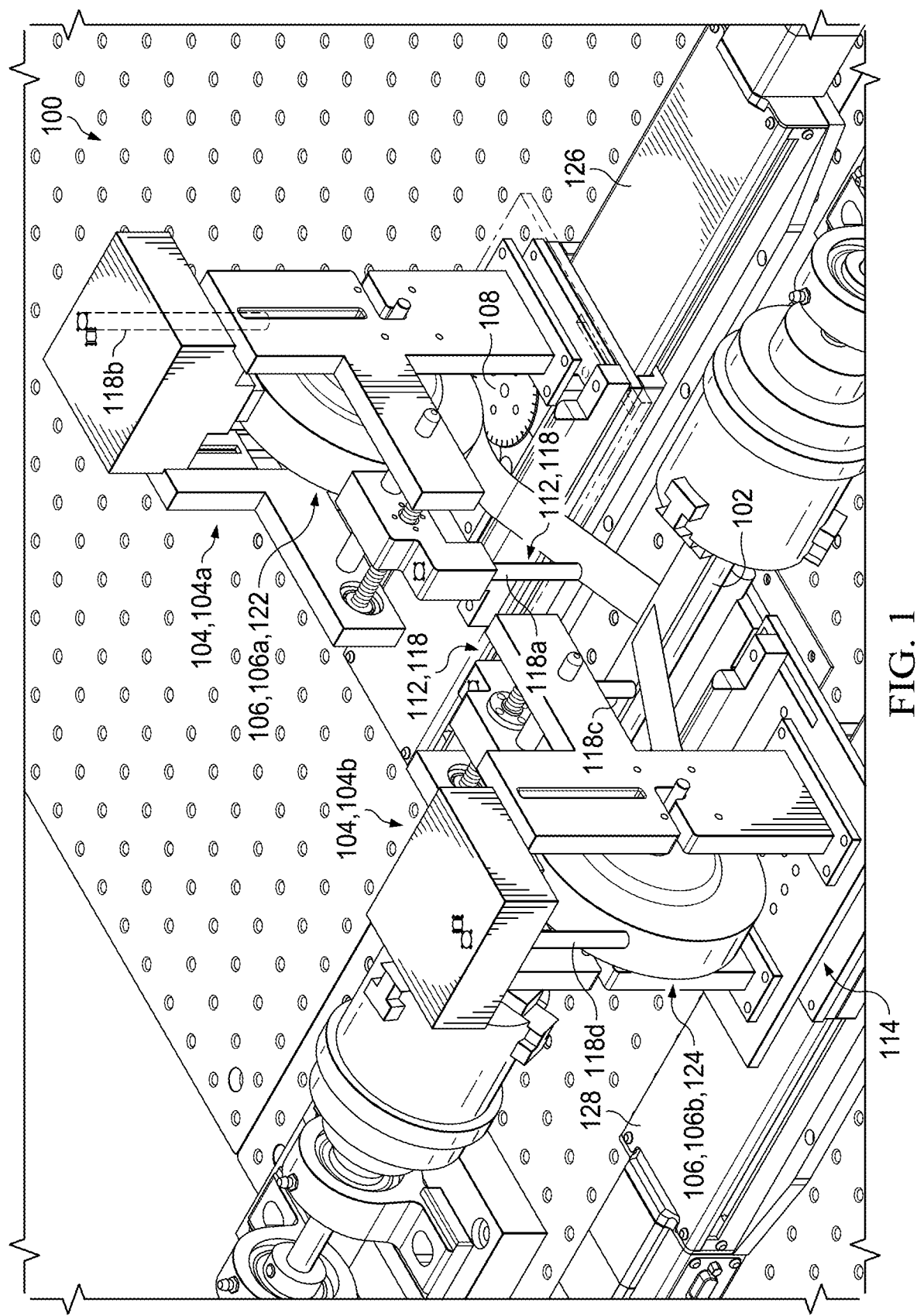
FIG. 1 is a plan-view schematic of an apparatus for fabricating a composite or hybrid tube.
Figure 2:
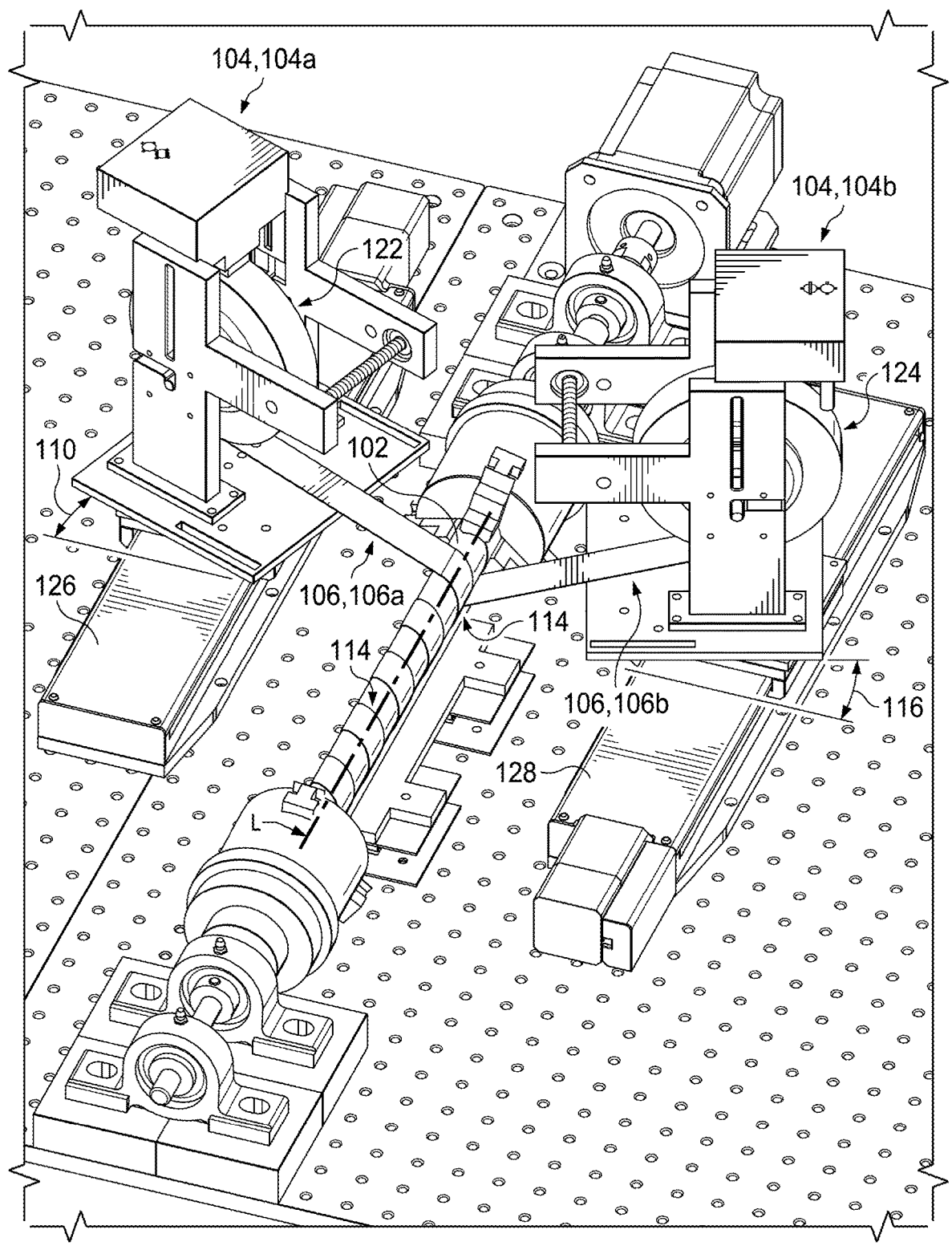
FIG. 2 is a top-view photograph of part of the apparatus for fabricating a composite or hybrid tube.

Referring to FIGS. 1 and 2, the apparatus 100 includes a rotatable mandrel 102 and a housing 104 configured to translate alongside the rotatable mandrel 102 and dispense a strip 106 to be helically wound about the rotatable mandrel 102. For example, the housing 104 may be rotatably attached to an underlying motorized linear stage 126. The housing 104 comprises an angle adjustment mechanism 108 to control a dispensation angle 110 of the strip 106. The apparatus 100 also includes at least one energy or adhesive source 112 for bonding overlapping strip portions 114 on the mandrel 102, so as to form a hybrid tube 120. The at least one energy or adhesive source 112 may also be configured for translation alongside the mandrel 102.

As shown in FIGS. 1 and 2, the housing 104 may be a first housing 104a, and the strip 106 may be a first strip 106a, and the apparatus 100 may further include a second housing 104b configured to translate alongside the rotatable mandrel 102 and dispense a second strip 106b to be helically wound about the rotatable mandrel 102. As shown, the second housing 104b may be rotatably attached to an underlying motorized linear stage 128. The first housing 104a and the second housing 104b may be positioned on opposing sides of the mandrel 102. Each housing 104a, 104b may be positioned on the respective linear stage 126,128 to facilitate translation alongside the mandrel 102. Like the first housing 104a, the second housing 104b may include an angle adjustment mechanism 114 to control a dispensation angle 116 of the second strip 106b. The mandrel 102 may be collapsible to facilitate easy removal of the hybrid tube 120 after fabrication.

The at least one energy or adhesive source 112 referred to above, which may be configured for translation alongside the mandrel 102 to bond overlapping strip portions 114, may also or alternatively be configured for coordinated movement (e.g., translation and/or rotation) with the first and/or the second housing 104a,104b. The at least one energy or adhesive source 112 may include, for example, one or more ultrasonic horns for producing ultrasonic vibrations, one or more lasers for emitting a laser beam, one or more electrodes for resistance welding, arc welding, or another welding method, and/or one or more adhesive sources (e.g., a mixer tube 118) for providing an adhesive composition.

In one example, as shown in FIG. 1, the apparatus 100 may include a plurality of the mixer tubes 118, including first and second mixer tubes 118a,118b. Each mixer tube 118 may have an internal configuration (e.g., static spiral blades) designed to promote mixing of fluid passing therethrough. The first mixer tube 118a may be configured for coordinated movement with the first housing 104a and for dispensation of the adhesive composition on a first side of the first strip 106a. Similarly, the second mixer tube 118b may be configured for coordinated movement with the first housing 104a and for dispensation of the adhesive composition on a second side of the first strip 106a. The mixer tubes 118 may also or alternatively include third and fourth mixer tubes 118c,118d. The third mixer tube 118c may be configured for coordinated movement with the second housing 104b and for dispensation of the adhesive composition on a first side of the second strip 106b, and the fourth mixer tube 118d may be configured for coordinated movement with the second housing 104b and for dispensation of the adhesive composition on a second side of the second strip 106b. In this example, both sides of each of the first and second strips 106a,106b are partly or full coated with the adhesive composition. It is also contemplated that the adhesive composition may be applied to just one side of the strip(s) 106a, 106b; in such a case, the apparatus 100 may include only the first and third mixer tubes 118a,118c, for example, or only the second and fourth mixer tubes 118b,118d, or some other combination of the mixer tubes 118.

Figure 7:
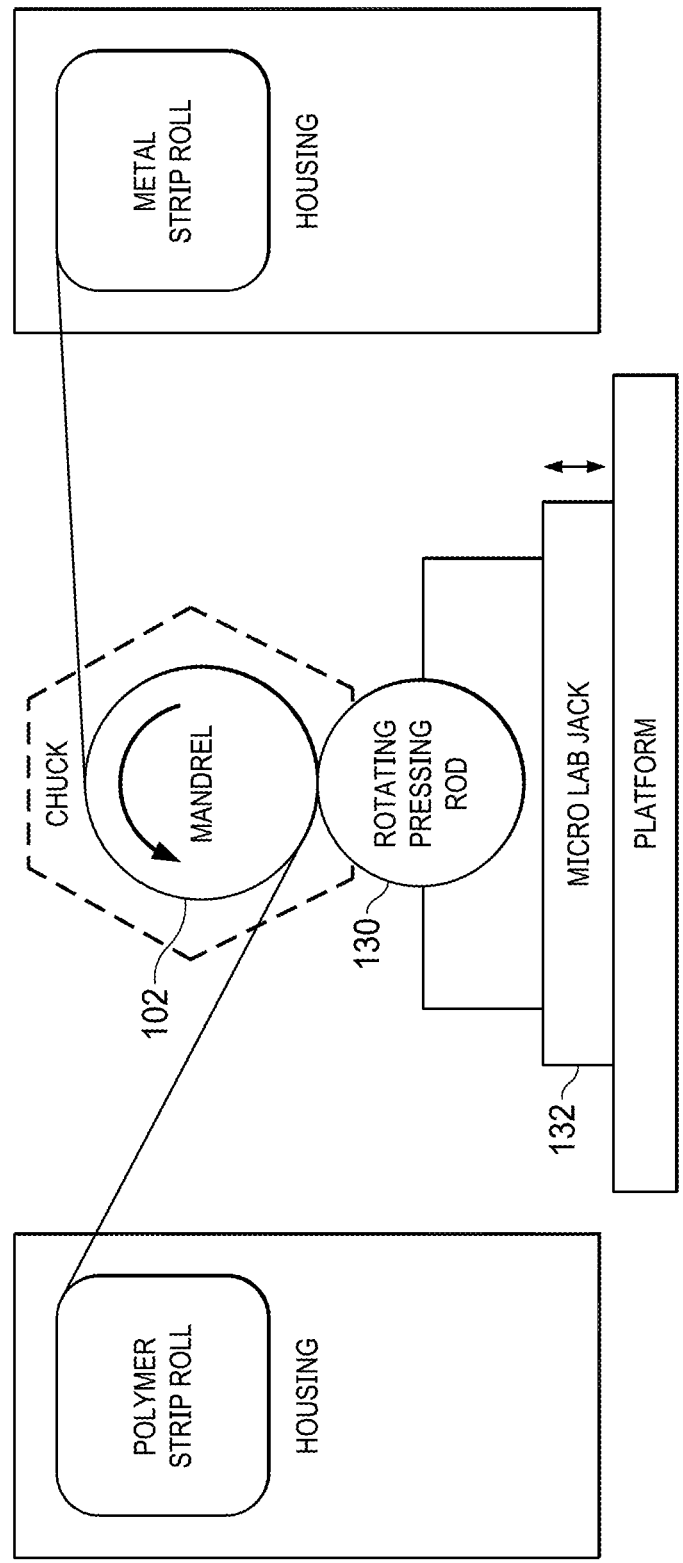
FIG. 7 is a schematic showing a transverse cross-sectional view of the apparatus for fabricating a composite or hybrid tube.

The apparatus 100 may further include a rotating pressing rod 130, which is discussed further below and shown schematically in FIG. 7, to apply pressure to the strip(s) 106 during the helical winding. The rotating pressing rod 130 may be positioned adjacent to the mandrel 102, such as beneath the mandrel 102 as shown in FIG. 7, and may be brought into position for pressing by a jack 132.

Figure 3A:
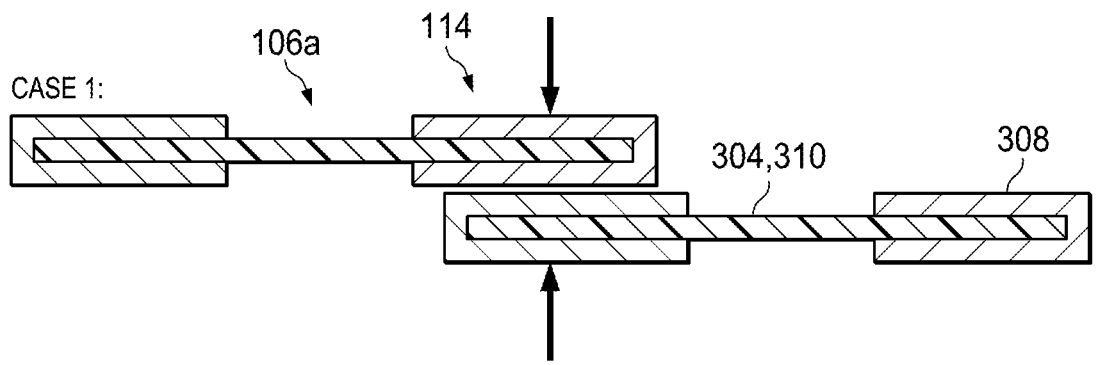
FIGS. 3A-3C are schematics showing a first embodiment ("Case 1") of a hybrid tube design.
Figure 3B:
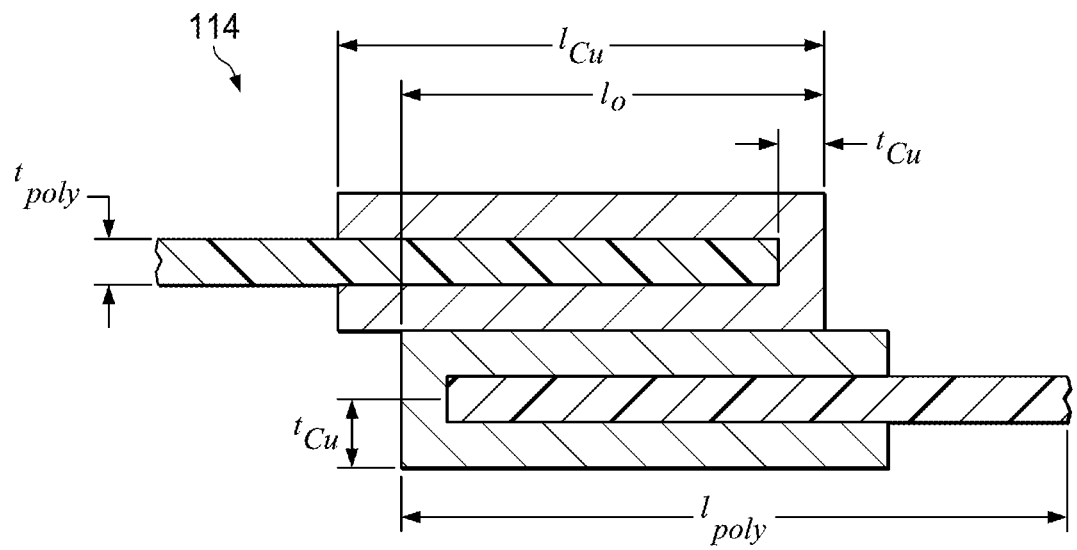
Figure 3C:
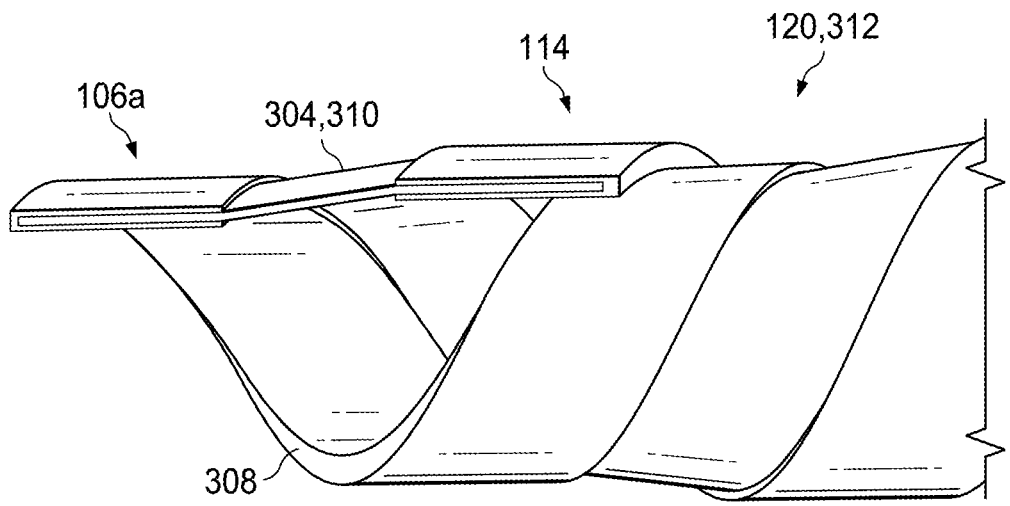

FIGS. 3A-3C, 4A-4C and 5A-5C show portions of exemplary hybrid tubes 120 that may be fabricated using the apparatus and method described in this disclosure. The "Case 1" design shown in FIGS. 3A-3C utilizes a single strip (a first strip 106a) that includes two different materials, such as a polymer and a metal (e.g., copper), for helical winding. In this example, the first strip 106a comprises a polymer strip 304 including metal-coated portions 308 that extend along a length of the polymer strip 304 on both front and back sides of the strip 304. A central longitudinal portion 310 of the polymer strip 304 may be completely or partially exposed between the metal-coated portions 308 on the front and back sides. The metal-coated portions 308 may be formed by passing the polymer strip 304 through a flow-channel electroplating bath, in one example, or by conformal joining of copper foils to the polymer strip. When the Case 1 strip 106a is helically wound around the mandrel, the strip pattern 312 shown in FIG. 3C is obtained, and the overlapping strip portions 114 may be bonded using the energy or adhesive source mentioned above. For clarity in showing the strip patterns, the mandrel employed during fabrication of the hybrid tubes 120 is not shown in the schematics of FIG. 3A-3C, 4A-4C, or 5A-5C.

Figure 4A:
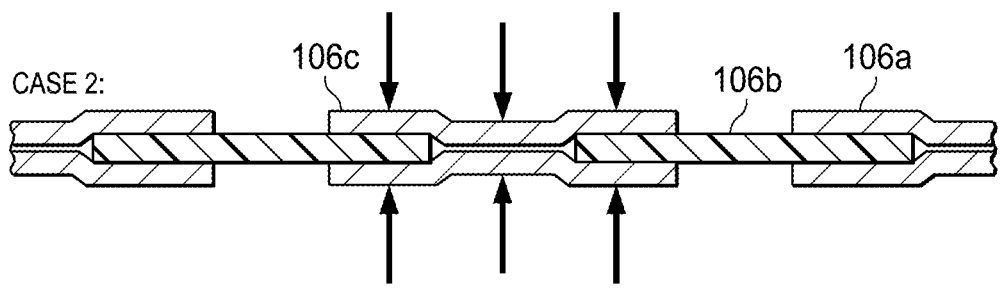
FIGS. 4A-4C are schematics showing a second embodiment ("Case 2") of a hybrid tube design.
Figure 4B:
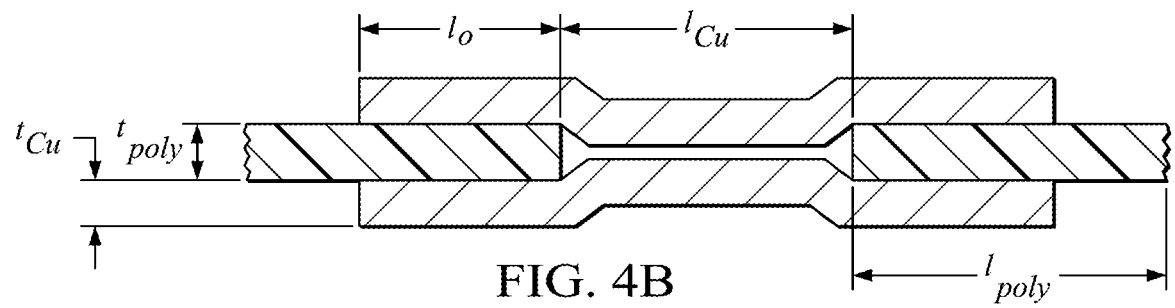
Figure 4C:
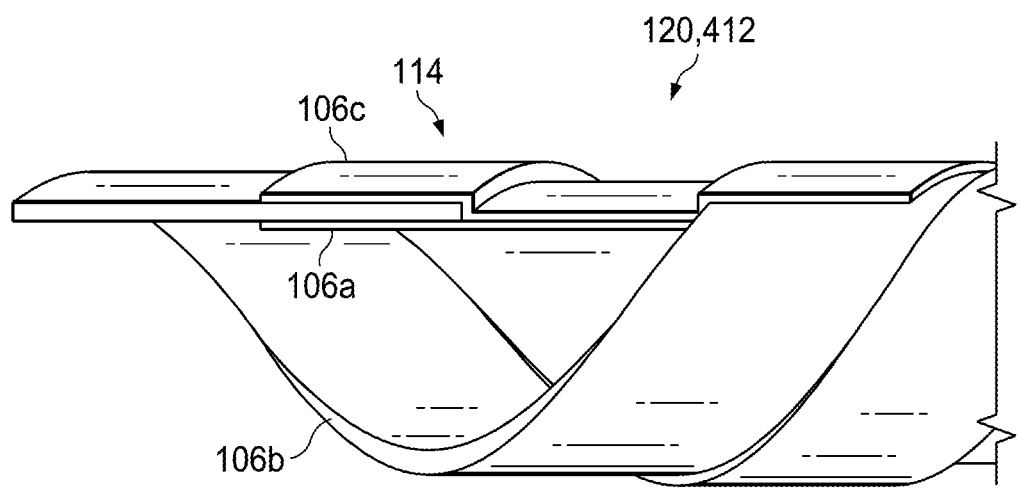

The "Case 2" design utilizes first, second and third strips 106a,106b,106c, each comprising a different material, which are helically wound around the mandrel serially, that is, separately. In one example, the first strip 106a may be a metal strip, the second strip 106b may be a polymer strip, and the third strip 106c may be a metal strip. Once the Case 2 strips 106a,106b,106c are helically wound around the mandrel, the strip pattern 412 shown in FIG. 4C is obtained, and the overlapping strip portions 114 may be bonded using the energy or adhesive source mentioned above.

Figure 5A:
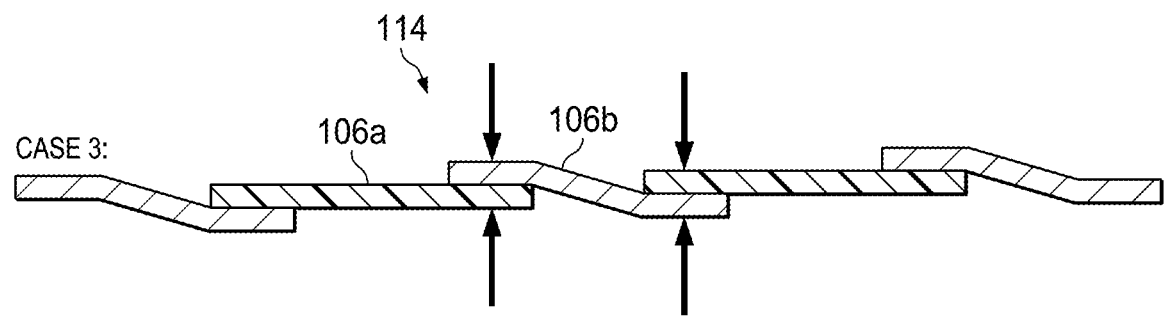
FIGS. 5A-5C are schematics showing a third embodiment ("Case 3") of a hybrid tube design.
Figure 5B:
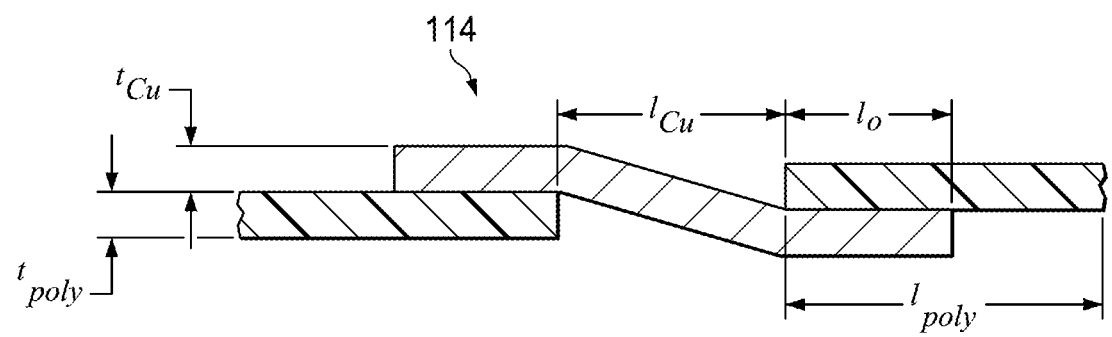
Figure 5C:
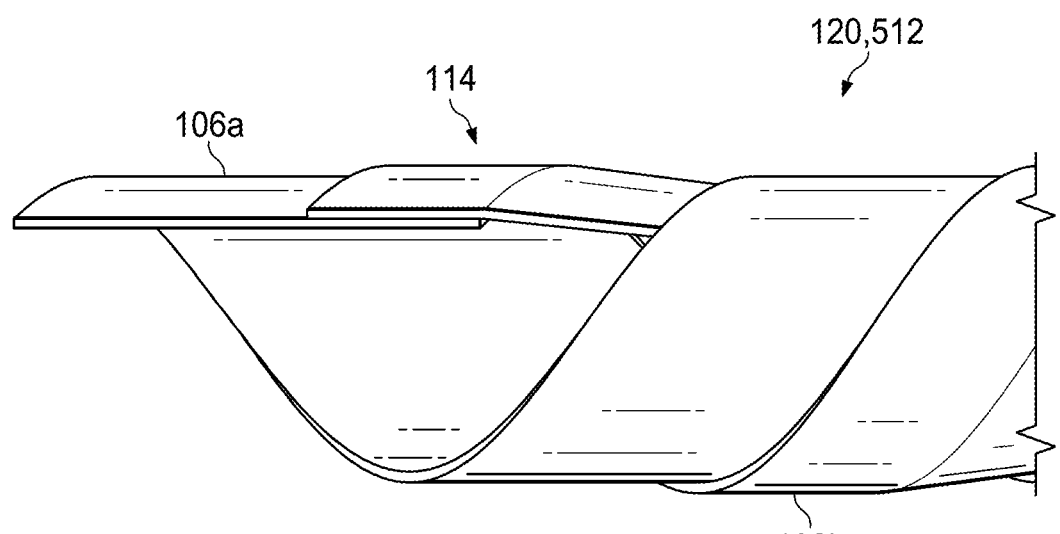

The "Case 3" design utilizes first and second strips 106a,106b, each comprising a different material, which are helically wound around the mandrel simultaneously. In one example, the first strip 106a may be a polymer strip and the second strip 106b may be a metal (e.g., copper) strip. When the Case 3 strips 106a,106b are helically wound around the mandrel, the strip pattern 512 shown in FIG. 5C is obtained, and the overlapping strip portions 114 may be bonded using the energy or adhesive source mentioned above.

Figure 8:
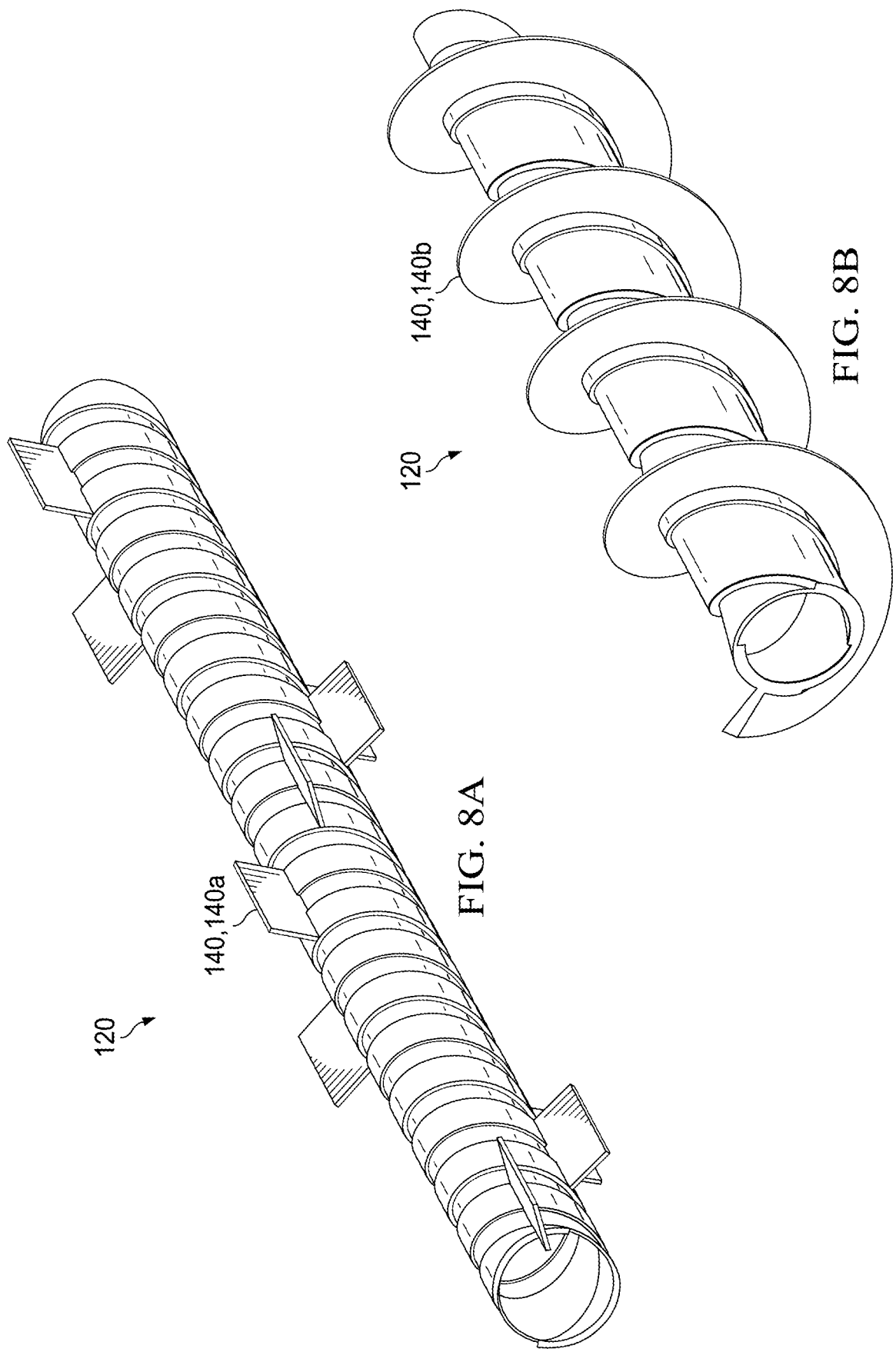
FIGS. 8A and 8B provide schematics of exemplary hybrid tubes including fins for enhanced heat transfer.

In addition to the exemplary hybrid tubes 120 described above, hybrid tubes having other designs that utilize at least one strip comprising at least two different materials may be fabricated using the apparatus and method described in this disclosure. In some examples, the hybrid tubes may have extended metal surfaces and continuous metal pathways that can improve both heat transfer and mechanical stability compared to all-polymer pipes. As described below, thermal conductivities ($k_{eff}$) of about 1 $Wm^{-1}K^{-1}$ or higher may be achieved for exemplary hybrid tubes using only about 20-35 vol. % metal, with a remainder being a polymer. FIGS. 8A and 8B show examples of hybrid tubes 120 formed with additional metal fins 140 to further enhance heat transfer in an exhaust flue gas stream or other flow. These fins 140 may be applied to (e.g., bonded to) the hybrid tube 120 after fabrication or they may be dynamically fabricated as a part of the rolling process. For example, the metal films 140 can be crimped just prior to rolling to form short fins. Fins can be designed for different orientations with respect to the flow. Examples of designs are a continuous ridge-like spiral fin 140b (FIG. 8B) as well as discrete fins 140a (FIG. 8A) oriented transverse to the flow with spacing and dimensions determined by flow conditions. For a continuous ridge, short notches can be cut into the ridge at intervals to facilitate rolling on a mandrel. Compared to all-polymer tubes, the composite tubes may exhibit about 20% higher overall heat transfer coefficient and can sustain high internal pressures (e.g., up to about 3.1 MPa maximum operating internal pressure).

A method of fabricating hybrid tubes 120, such as those shown in FIG. 3A-5C, is now explained. Referring again to FIGS. 1 and 2, the method includes rotating a mandrel 102 about a longitudinal axis L thereof, and, during the rotating, helically winding a first strip 106a about the mandrel 102. The first strip 106a is dispensed from a first housing 104a translating alongside the mandrel 102. More specifically, the first strip 106a may be dispensed from a roll 122 contained in the first housing 104a. A translation speed of the first housing 104a may be coordinated with a rotational speed of the mandrel 102. For example, the translation speed may lie in a range from 0.1 cm/s to 0.7 cm/s, and the rotational speed may lie in a range from about 2 rpm to about 10 rpm. As described above, the first housing 104a may be rotatably attached to a motorized linear stage 126, and the rotational speed of the mandrel 102 may be controlled by a drive motor. The first strip 106a may be dispensed at a predetermined angle, referred to as the dispensation angle 110 above, to control the helicity of the strip pattern, where the dispensation angle 110 is measured from a normal to the mandrel 102. During or after the helical winding, while the mandrel is rotating, overlapping strip portions 114 on the mandrel 102 are bonded in order to form the hybrid tube 120.

Depending on the desired strip pattern, the method may further include helically winding a second strip 106b about the rotating mandrel 102. The second strip 106b may be dispensed from a second housing 104b translating alongside the mandrel 102. More specifically, the second strip 106b may be dispensed from a roll 124 contained in the second housing 104b. A translation speed of the second housing 104b may be coordinated with a rotational speed of the mandrel 102. As described above, the second housing 104a may be rotatably attached to a motorized linear stage 128. As shown in FIGS. 1 and 2, the first and second housings 104a,104b may be positioned on opposing sides of the mandrel 102. The second strip 106b may be dispensed at a predetermined angle, referred to as the dispensation angle 116 above, to control the helicity of the strip pattern, where the dispensation angle 116 is measured from a normal to the mandrel 102. The dispensation angles 110,116 of the first and second strips 106a,106b may be the same or different. As indicated above, during or after the helical winding, while the mandrel is rotating, overlapping strip portions 114 on the mandrel 102 are bonded in order to form the hybrid tube 120.

The helical winding of the second strip 106b may occur during or after the helical winding of the first strip 106a. In other words, depending on the desired strip pattern of the composite tube 120 to be formed, the first and second strips 106a,106b may be helically wound on the mandrel 102 simultaneously, as shown in FIGS. 1 and 2, or serially (separately). Further strips, such as a third strip 106c, may be helically wound about the mandrel 102 simultaneously with the first and/or second strips 106a,106b or separately from the first and/or second strips 106a,106b. The third strip 106c and any additional strips may be dispensed from the first or second housing 104a,104b, or from a third or additional housing configured to translate alongside the mandrel and having any and all characteristics and capabilities of the first and/or second housings 104a,104b. More specifically, the third strip 106c and any additional strips may be dispensed from a roll contained in the respective housing. The strip(s) may be dispensed at a rate from about 0.3 ft/min (about 0.15 cm/s) to about 5 ft/min (about 2.5 cm/s), or more typically from about 1 ft/min (about 0.51 cm/s) to about 3 ft/min (about 1.5 cm/s), and faster rates may also be achievable. The dispensation angle of the third strip 106c and any additional strips may be controlled as described above.

The bonding of the overlapping strip portions 114 may comprise applying energy or an adhesive composition, or both; accordingly, at least one energy or adhesive source 112 may translate alongside or otherwise exhibit coordinated movement with the rotating mandrel 102 to apply the energy and/or the adhesive composition and effect bonding. A translation speed of the at least one energy or adhesive source 112 may be coordinated with a rotational speed of the mandrel 102. When an adhesive composition is employed for bonding, a curing step (e.g., application of light or heat) may be required after applying the adhesive composition to ensure that a robust bond is formed.

In one example, where bonding of the overlapping strip portions 114 comprises applying energy from at least one energy source, the energy may comprise ultrasonic vibrations and the energy source may comprise an ultrasonic horn. Also or alternatively, the energy may comprise heat, electricity and/or light (e.g., a laser beam) and the energy source may comprise a laser, electrode and/or an electric arc, for example.

Figure 6:
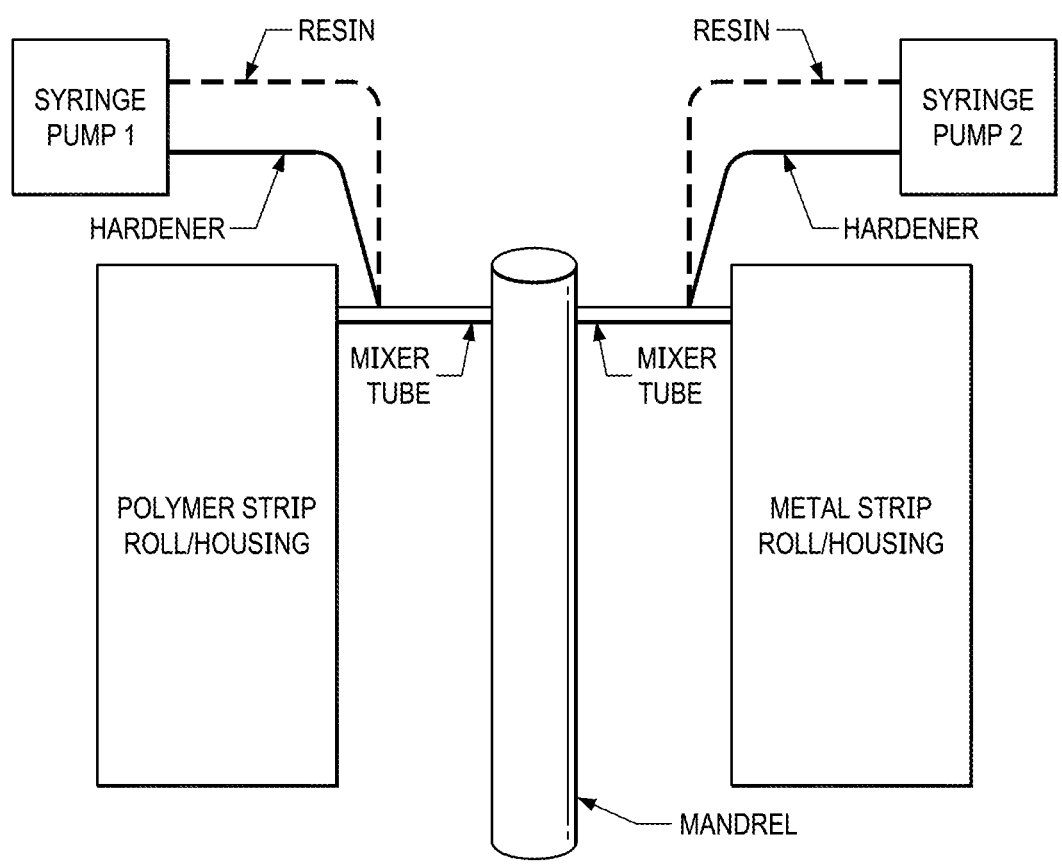
FIG. 6 shows an exemplary adhesive composition dispensing system.

In another example, where bonding of the overlapping strip portions 114 comprises applying an adhesive composition from at least one adhesive source, one or more mixer tubes 118 may be employed to dispense a suitable adhesive composition, such as an acrylic resin, an epoxy resin, or a silicone resin. In some cases the adhesive composition may further include a hardener or curing agent. The schematic of FIG. 6 shows an exemplary adhesive dispensing system, where syringe pumps deliver a resin and optionally a hardener to the mixer tubes, which in turn can dispense the adhesive composition onto the strip and/or overlapping strip portions for bonding. The adhesive dispensing system allows for controlled and precise dispensing of the adhesive composition, as well as uniform mixing of the resin and hardener (when used) in a suitable ratio (e.g., 1:1) to ensure good quality of the adhesive. The curing step mentioned above may take place during or after helical winding of the strip(s) onto the mandrel.

As described above in reference to FIG. 1, there may be a number of the mixer tubes 118, including first and second mixer tubes 118a,118b, where the first mixer tube 118a may be configured for coordinated movement with the first housing 104a and may dispense the adhesive composition on a first side of the first strip 106a, and where the second mixer tube 118b may be configured for coordinated movement with the first housing 104a and may dispense the adhesive composition on a second side of the first strip 106a. The mixer tubes 118 may also include third and/or fourth mixer tubes 118c,118d, where the third mixer tube 118c may be configured for coordinated movement with the second housing 104b and may dispense the adhesive composition on a first side of the second strip 106b, and where the fourth mixer tube 118d may be configured for coordinated movement with the second housing 104b and may dispense the adhesive composition on a second side of the second strip 106b. Accordingly, the first and/or second strips 106a,106b (and any additional strip(s)) may include the adhesive composition on one or both sides as they are wound about the rotating mandrel 102, and thus the bonding of the overlapping strip portions 114 may occur as they are formed.

The overlapping strip portions 114 may comprise overlapping portions of the same or different strips. In one example, such as the Case 1 strip design described above and shown in FIGS. 3A-3C, the overlapping strip portions 114 may comprise overlapping portions of the first strip 106a. In another example, such as the Case 3 strip design described above and shown in FIGS. 5A-5C, the overlapping strip portions 114 may comprise overlapping portions of the first and second strips 106a,106b. The energy and/or adhesive composition may be applied directly to the overlapping strip portions 114 during or after helical winding to effect bonding of the overlapping portions. In some examples, the energy or adhesive composition may be applied directly to one or both sides of the first 106a, second 106b, third 106c, and/or any additional strips prior to winding the respective strip about the mandrel 102, such that the overlapping strip portions 114 are bonded as they are formed.

The method may further include, during the helical winding, applying pressure to the strip or strips (e.g., the first, second, third and/or additional strips) 106 being wound about the mandrel. More specifically, the pressure may be applied to the overlapping strip portions 114. Referring to FIG. 7, a rotating pressing rod 130 may be positioned adjacent to the mandrel 102 to apply the pressure, where a rotational speed of the rotating pressing rod 130 may be coordinated with that of the rotating mandrel. For example, if the mandrel 102 is rotating counterclockwise, the rotating pressing rod 130 may be rotated clockwise at the same rotational speed. The rotating pressing rod 130 of this example is disposed beneath the mandrel 102 and brought into position adjacent to the mandrel 102 by a jack 132. The application of pressure to the overlapping strip portions 114 during helical winding may help to promote bonding and/or proper positioning of the strip(s) 106 on the mandrel 102.

Each strip 106,106a,106b,106c typically comprises a polymer and/or a metal, but other materials (e.g., semiconductors, ceramics) may also or alternatively be used. Suitable polymers may include polyimides (e.g., Kapton®), acrylic, polytetrafluorethylene (PTFE), polyvinylchloride (PVC), and/or polyethylene terephthalate (PET). Suitable metals may include copper, aluminum, brass, and/or steel. The strips may also be fabricated with one or more thin-film electronic devices (e.g., thermoelectric devices and/or integrated sensors) prior to winding. It is understood that the polymer, metal or other material may make up an entirety of a strip or a portion of a strip (e.g., as a layer or coating). Each strip or layer may have a thickness in a range from about 10 microns to about 10 mm, and the thickness is more typically in a range from about 50 microns to about 1 mm. The thickness of the polymer strip or layer may be the same as or different from that of the metal strip or layer in a given hybrid tube. For example, referring to FIGS. 5A-5C, the thickness of the first strip 106a may be the same as or different from (greater than or less than) the thickness of the second strip 106b. When a third strip 106c is employed, as in FIGS. 4A-4C, it may also have a different (smaller or larger) thickness than the first and/or second strips 106a, 106b. For example, as described below, to optimize the properties of the hybrid tube, it may be beneficial for the thickness of the polymer layer or strip to be greater than the thickness of the metal layer or strip. The width of the metal and polymer strips may range from about 5 mm to about 30 mm, and the width is more typically in a range from about 10 mm to 20 mm. The fabricated hybrid tubes may include a metal volume fraction $\phi$ from about 0.2 to 0.8, with $\phi$ values from about 0.2 to 0.4 being preferred. The hybrid tubes may be constructed to have any desired diameter and length, such as from 1 cm to 10 cm in diameter and from 20 cm to 1 m in length. The pitch ($l_o$ and $l_{Cu}$ in FIGS. 3-5) of the helical winding may also be dynamically modified to provide additional strength, for instance, near the ends of the pipe. Similarly, the diameter of the rotating mandrel 102 may be varied across the length of the mandrel, for instance, one end can be shorter in diameter than the other to allow for connecting multiple pipes together. In some examples, prior to helical winding, the strip(s) may be coated (e.g., dip coated) with an anti-fouling coating or other functional coating, which may comprise $SiO_2$, for example.

Exemplary dimensions of the strips and overlapping strip portions, as well as computed thermal characteristics for the hybrid tube designs shown in FIGS. 3A-5C, are provided in Tables 1-3 below. The dimensions are defined in FIGS. 3B, 4B and 5B, and, additionally, $t_{Cu}$ is thickness of copper layer, $t_{poly}$ is thickness of polymer layer, $l_{Cu}$ is length of copper layer, $l_{poly}$ is length of polymer layer, $l_o$ is length of overlap, $t_{avg}$ is length-weighted average thickness of the geometry, $k_{eff}$ is effective thermal conductivity, $\phi$ is volume fraction of metal, R" is thermal resistance of unit area, $\chi$ is the area fraction of metal exposed to convection, and $U/U_{poly}$ represents the overall heat transfer improvement achieved by using a metal-polymer composite tube over an equivalently thick ($t_{avg}$) polymer tube, where U and $U_{poly}$ are the overall heat transfer coefficients of the metal-polymer composite and an equivalent polymer (e.g., $k_{poly}$=0.2 $Wm^{-1}K^{-1}$), respectively.

TABLE 1

Exemplary Case 1 Dimensions and Thermal Characteristics. The top 2 points with high ($k_{eff}$, $U/U_{poly}$) or low ($\phi$, R") are shown in bold.

| | Dimensions (mm) | | | | | | | | |
|---|---|---|---|---|---|---|---|---|---|
| | $t_{Cu}$ | $t_{poly}$ | $l_o$ | $l_{Cu}$ | $t_{avg}$ | $k_{eff} Wm^{-1} K^{-1}$ | $\phi$ | $U/U_{poly}$ | R" $m^2$ K $W^{-1}$ | $\chi$ |
| 1 | 1 | 1 | 15 | 15 | 4.00 | 1.85 | 0.62 | 1.17 | 2.17 × 10$^{-3}$ | 0.67 |
| 2 | 1 | 1 | 10 | 15 | 3.33 | 1.82 | 0.62 | 1.14 | 1.83 × 10$^{-3}$ | 0.71 |
| 3 | 1 | 2 | 15 | 15 | 5.60 | 1.64 | 0.46 | 1.23 | 3.41 × 10$^{-3}$ | 0.68 |
| 4 | 1 | 2 | 15 | 20 | 6.40 | 0.82 | 0.52 | 1.22 | 7.79 × 10$^{-3}$ | 1.00 |
| 5 | 0.5 | 2 | 15 | 15 | 4.40 | 1.05 | 0.29 | 1.16 | 4.16 × 10$^{-3}$ | 0.65 |

TABLE 2

Exemplary Case 2 Dimensions and Thermal Characteristics. The top 2 points with high ($k_{eff}$, $U/U_{poly}$) or low ($\phi$, R") are shown in bold.

| | Dimensions (mm) | | | | | $k_{eff}$ Wm$^{-1}$ K$^{-1}$ | $\phi$ | $U/U_{poly}$ | R" m$^2$ K W$^{-1}$ | $\chi$ |
|---|---|---|---|---|---|---|---|---|---|---|
| | $t_{Cu}$ | $t_{poly}$ | $l_o$ | $l_{Cu}$ | $t_{avg}$ | | | | | |
| 1 | 1 | 2 | 18 | 20 | 2.71 | 2.77 | 0.60 | 1.14 | 1.16 × 10$^{-3}$ | 0.94 |
| 2 | 1 | 2 | 18 | 15 | 3.60 | 2.64 | 0.58 | 1.15 | 1.26 × 10$^{-3}$ | 0.93 |
| 3 | 1 | 2 | 18 | 5 | 3.62 | 2.18 | 0.53 | 1.16 | 1.66 × 10$^{-3}$ | 0.92 |
| 4 | 0.75 | 2 | 15 | 20 | 2.86 | 2.03 | 0.50 | 1.12 | 1.41 × 10$^{-3}$ | 0.84 |
| 5 | 0.4 | 2 | 18 | 5 | 2.51 | 1.07 | 0.30 | 1.10 | 2.34 × 10$^{-3}$ | 0.92 |

TABLE 3

Exemplary Case 3 Dimensions and Thermal Characteristics. The top 2 points with high ($k_{eff}$, $U/U_{poly}$) or low ($\phi$, R") with $\phi < 0.7$ are shown in bold.

| | Dimensions (mm) | | | | | $k_{eff}$ Wm$^{-1}$ K$^{-1}$ | $\phi$ | $U/U_{poly}$ | R" m$^2$ K W$^{-1}$ | $\chi$ |
|---|---|---|---|---|---|---|---|---|---|---|
| | $t_{Cu}$ | $t_{poly}$ | $l_o$ | $l_{Cu}$ | $t_{avg}$ | | | | | |
| 1 | 1 | 0.5 | 15 | 15 | 1.18 | 0.66 | 0.69 | 1.04 | 1.80 × 10$^{-3}$ | 0.56 |
| 2 | 1 | 0.5 | 10 | 20 | 1.00 | 0.63 | 0.67 | 1.03 | 1.59 × 10$^{-3}$ | 0.52 |
| 3 | 1 | 2 | 15 | 10 | 2.40 | 0.45 | 0.34 | 1.06 | 5.31 × 10$^{-3}$ | 0.53 |
| 4 | 1 | 2 | 15 | 15 | 2.27 | 0.47 | 0.37 | 1.06 | 4.83 × 10$^{-3}$ | 0.57 |
| 5 | 1 | 0.1 | 10 | 10 | 0.68 | 1.01 | 0.88 | 1.03 | 6.71 × 10$^{-4}$ | 0.42 |

For use in heat exchangers and other applications where thermal conductivity is important, the hybrid tubes preferably exhibit both high $k_{eff}$ and $U/U_{poly}$ at low $\phi$ and/or low $\chi$. Preferred examples have a high $k_{eff}$ and/or high $U/U_{poly}$, and most preferred examples have both high $k_{eff}$ and $U/U_{poly}$ at $\phi<0.4$ and/or $\chi<0.5$. The highest effective thermal conductivity (about 2.77 Wm$^{-1}$K$^{-1}$) is obtained for Case 2 with $\phi=0.6$. Cases 1 and 3 reach up to 1.85 Wm$^{-1}$K$^{-1}$ and 0.67 Wm$^{-1}$K$^{-1}$ at $\phi=0.62$ and 0.7, respectively. Although the Case 3 structures do not achieve $k_{eff}>1$ Wm$^{-1}$K$^{-1}$ for $\phi<0.7$, it is notable that a $k_{eff}=1.01$ Wm$^{-1}$K$^{-1}$ is achieved at $\phi=0.88$ with $\chi=0.42$. These results suggest the hybrid tubes can reach a target effective thermal conductivity of ~1 Wm$^{-1}$K$^{-1}$ at ~30% volume fraction of copper in both Case 1 and Case 2. A larger volume fraction of metal may be required for less conductive metals, such as aluminum. Notably, the optimal design points that achieve a $k_{eff}$ of about 1 Wm$^{-1}$K$^{-1}$ at a low copper volume fraction (e.g., about 30%) typically have a much thicker polymer layer (e.g., 2 mm) and a thinner copper layer (e.g., 0.4 mm). Essentially, the optimal designs may use just enough copper to conduct the required heat across the thickness of the pipe. Designs can be chosen to have low overall metal volume for reduced cost, or high pipe thickness for enhanced thermomechanical strength. Case 3 structures have a low metal surface area fraction ($\chi=0.42$) and low overall thickness ($t_{avg}=0.68$ mm), which may mean a low overall volume of metal per unit volume of pipe. Case 1 and Case 2 structures have a low volume fraction $\phi$ and a high thickness ($t_{avg}=2.51$ mm), which may mean a high thermomechanical strength. A preliminary analysis suggests that the hybrid pipes described in this disclosure may enjoy a cost benefit over all-copper pipes. Based on this work, hybrid pipes are believed to be a viable alternative to all-polymer or all-copper pipes for low temperature (<150° C.) waste heat recovery from exhaust flue gas streams.

In this and other applications for the hybrid tubes, heat transfer between a fluid flowing inside the hybrid tube, such as water, and fluid flowing outside the hybrid tube, such as air or exhaust gas, is facilitated by convective heat transfer at the internal and external tube walls. It is found that convection may be enhanced due to the hybrid structure of the tubes. In particular, the hybrid tubes manufactured as described above possess intrinsic helical roughness due to steps at the interface between the adhesively or otherwise bonded strips, i.e., due to the overlapping strip portions described above. This unevenness, which is related to the thickness of the strip(s), may have the effect of disrupting the boundary layer of the flow and enhancing fluid mixing as well as convective heat transfer. In fact, computational investigation of the flow physics and heat transfer using the commercial Ansys Fluent software reveals that there can be significant enhancement to the convective heat transfer coefficient at the internal and external tube walls, when compared against a smooth tube.

Figure 9:
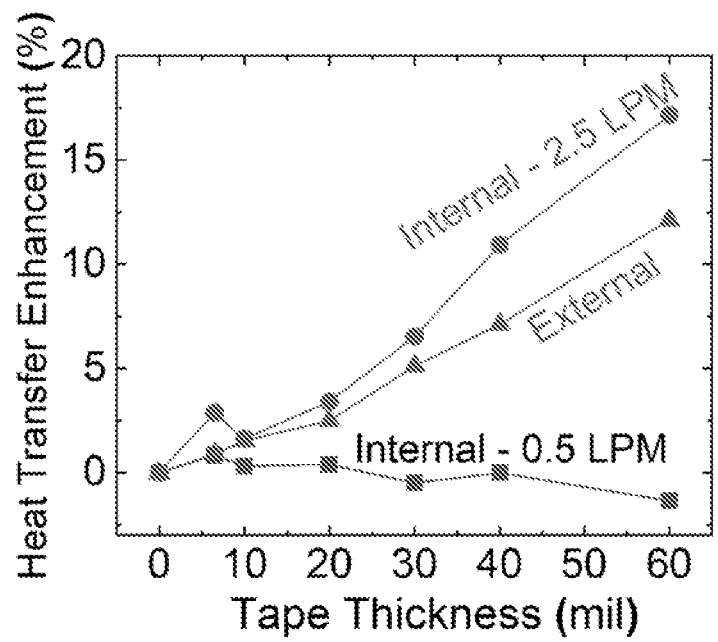
FIG. 9 shows enhancement in convective heat transfer for internal and external flows in/over a hybrid tube as a function of strip thickness compared to a conventional (smooth-walled) tube.

Internal (water) and external (air) flow was simulated on a single hybrid copper-polymer (Kapton) tube of 1 inch diameter, with the flow rate of water varied between 0.5 l/min to 2.5 l/min and the flow rate of air set to 0.15 m$^3$/s. The internal flow is laminar with a Reynolds number between 500 and 2000. The external air flow is turbulent and modeled using k-ε turbulence model. The strip thickness was varied from 0 mils (smooth wall) to 60 mils (1.524 mm). The tube wall temperatures were 120° C. and 15° C. for internal and external flow simulations, respectively. The simulations employed ~200,000 computational nodes and were tested for mesh size independence. The computed heat transfer rate enhancements over a smooth tube expressed as percentage improvement is plotted in FIG. 9. The simulations show that in typical flow conditions, convective heat transfer may be substantially enhanced at both internal and external flows. For example, the enhancement in internal and external convective heat transfer coefficient may be as high as 17% and 12%, respectively.

To clarify the use of and to hereby provide notice to the public, the phrases "at least one of <A>, <B>, . . . and <N>"

or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

Although considerable detail with reference to certain embodiments has been described, other embodiments are possible. The spirit and scope of the appended claims should not be limited, therefore, to the description of the preferred embodiments contained herein. All embodiments that come within the meaning of the claims, either literally or by equivalence, are intended to be embraced therein.

Furthermore, the advantages described above are not necessarily the only advantages, and it is not necessarily expected that all of the described advantages will be achieved with every embodiment.

The invention claimed is:

1. A method of forming a hybrid tube, the method comprising:
   rotating a mandrel about a longitudinal axis thereof;
   during the rotating, helically winding a first strip about the mandrel, the first strip being dispensed at a predetermined angle from a first housing translating alongside the mandrel;
   during or after the helical winding, while the mandrel is rotating, bonding overlapping strip portions on the mandrel, thereby forming the hybrid tube; and
   forming one or more metal fins on the hybrid tube.

2. The method of claim 1, further comprising, during the rotating, helically winding a second strip about the mandrel, the second strip being dispensed at a predetermined angle from a second housing translating alongside the mandrel.

3. The method of claim 2, wherein the helical winding of the second strip occurs during the helical winding of the first strip.

4. The method of claim 2, wherein the helical winding of the second strip occurs after the helical winding of the first strip.

5. The method of claim 2, wherein a translation speed of the second housing is coordinated with a rotational speed of the mandrel.

6. The method of claim 2, wherein the first strip comprises a metal strip, and wherein the second strip comprises a polymer strip.

7. The method of claim 2, wherein a thickness of the first strip is different from a thickness of the second strip.

8. The method of claim 2, further comprising, during the rotating, helically winding a third strip about the mandrel, the third strip being dispensed at a predetermined angle from the first housing, the second housing or another housing translating alongside the mandrel.

9. The method of claim 1, wherein bonding overlapping strip portions comprises applying energy or an adhesive composition, the energy or the adhesive composition being applied by at least one energy or adhesive source translating alongside the mandrel.

10. The method of claim 9, wherein a translation speed of the at least one energy or adhesive source is coordinated with a rotational speed of the mandrel.

11. The method of claim 1, wherein a translation speed of the first housing is coordinated with a rotational speed of the mandrel.

12. The method of claim 1, further comprising, during the helical winding, applying pressure to the overlapping strip portions on the mandrel.

13. The method of claim 1, wherein the first strip comprises a polymer strip including metal-coated portions extending along a length thereof on front and back sides of the polymer strip.

14. The method of claim 1, wherein the one or more metal fins comprise discrete fins configured to be oriented transverse to fluid flow.

15. The method of claim 1, wherein the one or more metal fins comprise a continuous spiral fin.

16. The method of claim 1, wherein forming the one or more metal fins on the hybrid tube comprises dynamically fabricating the one or more metal fins during the helical winding.

17. The method of claim 1, wherein forming the one or more metal fins on the hybrid tube comprises bonding the one or more metal fins to the hybrid tube after the helical winding.

* * * * *